United States Patent
Van Luchene

(10) Patent No.: US 7,677,973 B2
(45) Date of Patent: Mar. 16, 2010

(54) SECURING VIRTUAL CONTRACTS WITH CREDIT

(75) Inventor: Andrew Stephen Van Luchene, Santa Fe, NM (US)

(73) Assignee: Leviathan Entertainment, LLC, Santa Fe, NM (US)

( * ) Notice: Subject to any disclaimer, the term of this patent is extended or adjusted under 35 U.S.C. 154(b) by 792 days.

(21) Appl. No.: 11/279,991

(22) Filed: Apr. 17, 2006

(65) Prior Publication Data

US 2007/0087815 A1    Apr. 19, 2007

Related U.S. Application Data

(60) Provisional application No. 60/727,121, filed on Oct. 14, 2005.

(51) Int. Cl.
*G06F 17/00* (2006.01)
(52) U.S. Cl. ........................................... 463/29
(58) Field of Classification Search ............ 463/25–29, 463/1; 705/1, 80
See application file for complete search history.

(56) References Cited

U.S. PATENT DOCUMENTS

| | | | |
|---|---|---|---|
| 5,970,470 A | 10/1999 | Walker | |
| 6,009,458 A | 12/1999 | Hawkins et al. | |
| 6,141,653 A | 10/2000 | Conklin et al. | |
| 6,341,353 B1 | 1/2002 | Herman et al. | |
| 6,656,050 B2 | 12/2003 | Busch et al. | |
| 6,929,550 B2 | 8/2005 | Hisada | |
| 2002/0072412 A1 | 6/2002 | Young et al. | |
| 2002/0086733 A1 | 7/2002 | Wang | |
| 2002/0160838 A1 | 10/2002 | Kim | |
| 2003/0177187 A1* | 9/2003 | Levine et al. | 709/205 |
| 2004/0043806 A1 | 3/2004 | Kirby et al. | |
| 2005/0033601 A1 | 2/2005 | Kirby et al. | |
| 2005/0137015 A1 | 6/2005 | Rogers et al. | |
| 2005/0143174 A1 | 6/2005 | Goldman et al. | |
| 2005/0177428 A1 | 8/2005 | Ganz | |
| 2005/0182693 A1 | 8/2005 | Alivandi | |
| 2005/0192864 A1 | 9/2005 | Ganz | |
| 2005/0250415 A1 | 11/2005 | Barthold | |
| 2006/0035692 A1 | 2/2006 | Kirby et al. | |
| 2006/0079150 A1 | 4/2006 | Filoseta et al. | |
| 2006/0100018 A1 | 5/2006 | Ganz | |
| 2006/0178217 A1 | 8/2006 | Jung et al. | |
| 2006/0178899 A1 | 8/2006 | Jung et al. | |
| 2006/0178964 A1 | 8/2006 | Jung et al. | |
| 2006/0178965 A1 | 8/2006 | Jung et al. | |
| 2006/0178985 A1 | 8/2006 | Jung et al. | |
| 2006/0195394 A1 | 8/2006 | Jung et al. | |
| 2006/0224505 A1 | 10/2006 | Jung et al. | |
| 2006/0229976 A1 | 10/2006 | Jung et al. | |
| 2007/0024613 A1* | 2/2007 | Jung et al. | 345/419 |
| 2007/0087798 A1* | 4/2007 | McGucken | 463/1 |
| 2008/0139317 A1* | 6/2008 | Sheikh | 463/42 |
| 2009/0017886 A1* | 1/2009 | McGucken | 463/1 |

* cited by examiner

*Primary Examiner*—Ronald Laneau

(57) ABSTRACT

The disclosure provides novel video game methods and systems. The disclosure includes methods and systems for allowing game players to secure in-game contracts using credit systems such as credit cards or other financial instruments. The disclosure further provides methods and systems for providing virtual and/or real world financial penalties to game players and/or player characters who default on in-game agreements.

4 Claims, 1 Drawing Sheet

SECURING VIRTUAL CONTRACTS WITH CREDIT

PRIORITY CLAIM

The following application claims priority to U.S. patent application Ser. No. 11/355,232 Filed Feb. 14, 2006, which claims priority to U.S. Provisional Application Ser. No. 60/727,121 "Methods, Processes, and System to Enhance a Player Experience of a Video Game" filed Oct. 14, 2005. Each of which is hereby incorporated by reference in their entirety for all purposes.

BACKGROUND

Video games which are accessible to multiple players via a server are well known. For example, hundreds of thousands of players access games known as massive multi player online games (MMOGs). Players of these games customarily access a game repeatedly (for durations typically ranging from a few minutes to several days) over given period of time, which may be days, weeks, months or even years. The games are often constructed such that players pay a periodic subscription price (e.g., $15 per month) rather than, or in addition to, paying a one time purchase price for the game. Often, though not necessarily, these games have no ultimate "winner" or "winning goal," but instead attempt to create an enjoyable playing environment and a strong player community.

It would be advantageous to provide improved methods and apparatus for increasing the enjoyment and/or longevity of video games.

DETAILED DESCRIPTION

Figure 1:
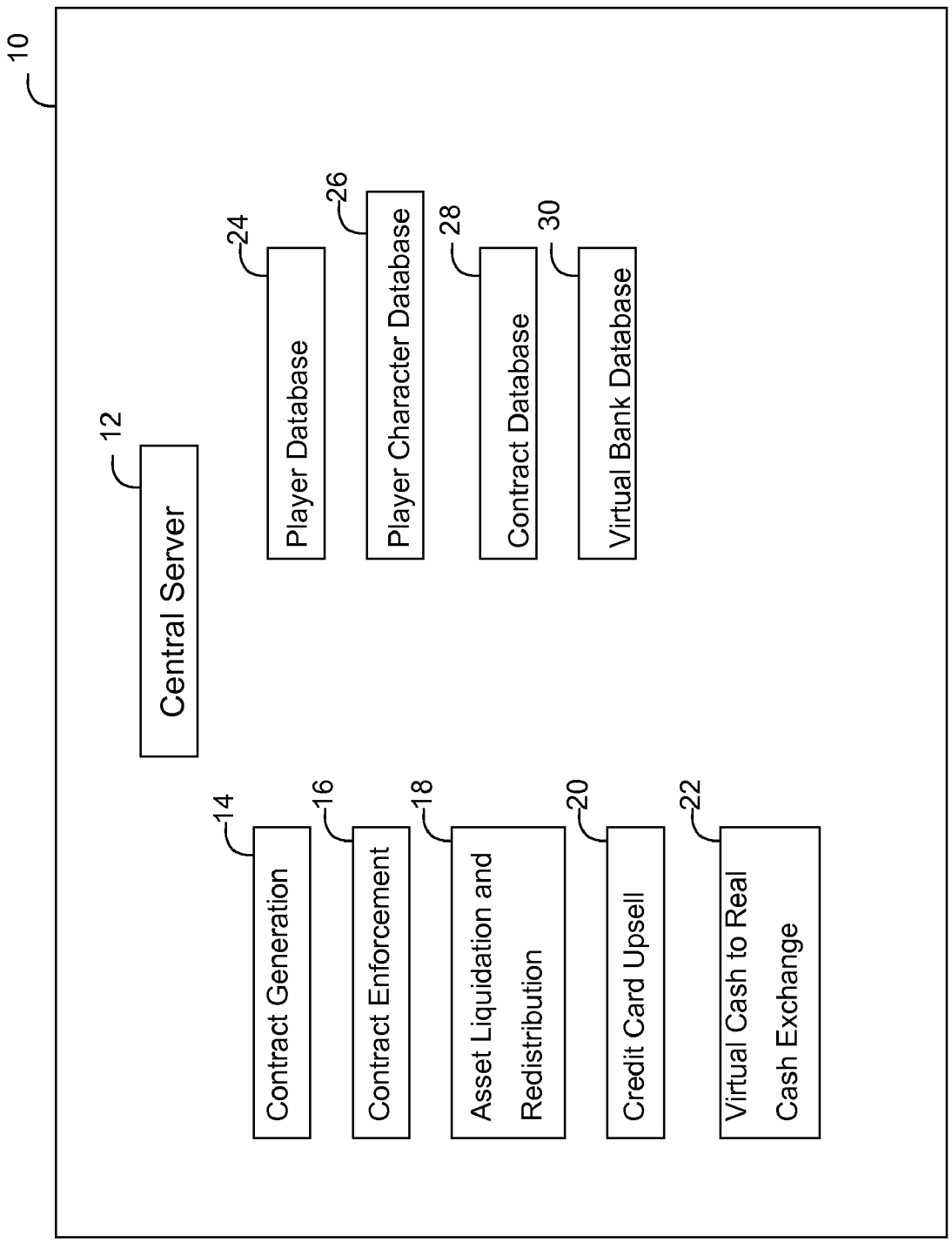
FIG. 1 is a block diagram of a system according to one embodiment of the present invention.

Unless stated to the contrary, for the purposes of the present disclosure, the following terms shall have the following definitions:

Credit Card-a credit instrument issued by a real world institution to a player that allows the player to make purchases by providing an account identifier (e.g. a credit card number) rather than cash or other currency. An example is a credit card like those issued by Visa, Mastercard, or American Express. For the purposes of the present disclosure, the term "Credit card" is intended in a very broad sense and is not limited to those situations in which a player's purchases are made on credit (i.e. where payments for those purchases is not due until a later time) but also includes financial instruments such as debit cards, check cards, and the like.

Real Cash Value—the value in real dollars of the obligation. This value can be determined by multiplying the financial obligation value by the then published exchange rate to real dollars.

Game Environment—an online game such as World of Warcraft or a virtual community such as Second Life.

Total virtual obligation amount—the total amount of virtual financial obligations associated with a player character account.

Virtual Contract—An enforceable agreement between a player character and either another player character or a game server. Some examples of virtual contracts are provided in U.S. Provisional Patent Application Ser. No. 60/652,036, which is hereby incorporated by reference in its entirety for all purposes.

Virtual—shall mean in a game environment or other intangible space.

Virtual Environment—an online game such as World of Warcraft or a virtual community such as Second Life.

Virtual Creditor—shall mean a first player character who is owed a virtual obligation by a second player character.

Virtual Financial Obligation—An agreement by a player character or entity to pay one or more game attributes to another player character, entity or the game server. This obligation can be a one time payment, or multiple payments over time. The obligation can specify that payments are due on virtual or real dates.

Virtual Financial Obligation Value—the in game value of the obligation. For virtual cash the value is stated as a virtual cash amount. For other game attributes, the value can be determined by generating a virtual cash market value for the item based on the current value in an online marketplace or exchange. The value of the obligation can also be set as a condition of the player contract.

Billing Information—shall mean any information pertaining to billing a player including a billing address, credit card account, bank account, pay pal account or other payment information.

Character—shall mean a persona created by a player in a video game.

Character Account—shall mean an account that tracks character attributes.

Character Attribute—shall mean any quality, trait, feature or characteristic a particular Character can have that is stored in the corresponding Character Account. Character Attributes shall include, but not be limited to:
  A character score
  A virtual object
  The physical appearance of a character
  An emblem or mark
  A synthetic voice
  Virtual money
  Virtual help points or credits
  The ability to join groups of other players at a later time
  A score for subsequent matching of later game parameters
  A relationship with another character
  A genetic profile or makeup Character Life—shall mean a fixed period of virtual or real world time that a player character can exist in a game environment.

Character Skills—shall mean game attributes inherent or acquired by a player character during game play such as, but not limited to: the ability to cast certain spells, foretell the future, read minds, use certain weapons, cook, hunt, find herbs, assemble herbs into potions, mine, assemble objects into other objects, fly, and/or enchant other player characters.

Computer Generated Character—shall mean any character that is generated by the system rather than being another player character.

Game Parameter—shall mean any part of a Video Game by which characters can be measured. Game Parameters shall include, but not be limited to:
  Completing all or part of a mission
  Playing for a certain period of time
  Winning a match against another player character or computer generated character
  Reaching a certain level or score
  using or obtaining an ability or technology
  kill/death ratios obtaining an object
solving a puzzle
accuracy with weapons
effective use of the proper weapon
killing a certain character/creature
getting through or to a certain geographic area
decreasing or increasing Karma Points
getting, buying, exchanging or learning a new skill or player attribute
having a child
getting married
obtaining, buying, trading, producing or developing raw materials
producing goods or services
earning income
earning a higher rank in an army
winning an election among two or more player characters
achieving deity status
improving player character status or caste
assisting other player characters with any of the above
speed of accomplishing any of the above In-game Marketplace—shall mean a virtual environment where Characters can exchange Attributes.

Massive Multi Player Online Video Game—Shall mean a Video Game that is played using either a network of a Video Game Central Server and at least two Video Game Consuls or a peer-to-peer network of at least two Video Game Consuls. Players create Characters that may interact with each other in a Video Game Environment that is stored on the Video Game Central Server and the Video Game Consuls.

Novice Player—Shall mean a player that is flagged as requiring the help of an expert to complete a Game Parameter.

NPC—(non player character) a computer generated character in the game

Player—shall mean an individual who can register an account with a Video Game Central Server or within a peer-to-peer network and create Characters that can interact with other Characters in a Video Game Environment.

Player Account—Shall mean an account on the Video Game Central Server or within a peer-to-peer network that contains a Player profile including personal, billing, and character account information.

Player Attribute—shall mean any attribute that can be applied to a player account. Player Attributes shall include, but not be limited to:
 Real Money
 Discount of monthly fees for playing game
 Monthly fee for playing a game
 Global character attribute settings for all characters created by player across multiple games.
 Rewards for encouraging another player to signup to play Player to Player Contract—shall mean a virtual but binding contract between player characters that allows the players to provide or exchange game attributes to one another. Once a player-to-player contract is established, the game server or peer-to-peer network automatically distributes acquired game attributes between the player characters based on the contract conditions.

Video Game—shall mean a game played on a Video Game Consul that may or may not be networked to a Video Game Central Server or within a peer-to-peer network.

Video Game Consul—shall mean a device comprising a CPU, memory and optional permanent storage residing at a player location that can allow for the playing of video games. Examples include, home PCs, Microsoft Xbox, and Sony Playstation.

Video Game Central Server—shall mean a CPU, memory and permanent or temporary storage that is connected to multiple Video Game Consuls that allows for Massive Multi Player Online Video Games to be played.

Video Game Environment—Shall mean a virtual video game world that is stored on the combination of the Video Game Central Server and Video Game Consuls where Characters interact and games are played.

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "consisting of" and variations thereof mean "including and limited to", unless expressly specified otherwise.

The terms "a", "an" and "the" mean "one or more", unless expressly specified otherwise.

The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus can include, e.g., a processor and those input devices and output devices that are appropriate to perform the method.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) are well known and could be used to store and manipulate the data types described herein. Likewise, object methods or behaviors of a database can be used to implement various processes, such as the described herein. In addition, the databases may, in a known manner, be stored locally or remotely from any device(s) which access data in the database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

According to one or more embodiments, the present invention provides a virtual environment in which a first player character establishes a contract with either one or more other player characters, entities (real or virtual) or a game server. The contract may specify one or more virtual financial obligation values that the first player character is obligated to pay at a specified virtual or real time and date. The contract may additionally include a credit card number associated with the game account of the first player. According to additional embodiments, in the event that the first player character fails to pay the virtual financial obligation value specified by the contract, a real cash value may be established that equals the virtual financial obligation value and the first player's credit card may be charged the real cash value amount.

Examples of in game contracts include, but are not limited to:

1. Virtual loans—a player character or entity can borrow virtual cash from another player character, entity or the game server. An interest rate and payment schedule can be established, and payments can be secured by the player character's or entity's credit card.
2. Virtual item rental—a player character or entity can rent an in game item from another player character, entity or the game server. A virtual cash fee per unit time can be established and secured with the player character's or entity's credit card.
3. Virtual dividend payments for shares of a company—a player character or entity can take his virtual company public by selling shares to other player characters or entities. He can guaranty a virtual cash dividend for each share per unit time. He can secure the virtual cash dividend with his credit card.
4. Virtual finance options—a player character or entity can choose to pay for an in game item with virtual cash over time rather than up front. A virtual cash payment amount and payment schedule is established, and the player or entity secures the virtual cash payments with a credit card. If the player character or entity cannot make a specified virtual cash payment amount on a scheduled payment date, a real cash value is determined for the payment amount and charged to his credit card.
5. Virtual item creation—A first player character can agree to build an in game item for a second player character by a certain date. If the first player character does not build the item in the time specified, either the virtual bank account or a credit card on file can be charged a specified fee for each unit of time that it is late. Also, if the first player character took an advance and or raw materials from the second player character, a virtual cash fee can be charged to the first player's credit card equal to the virtual cash value of the advance. If the first player character can make the virtual cash payment, a real cash value can be determined that is equal to the virtual cash value and charged to the first player's credit card.
6. Virtual futures contracts on goods bought or sold on an exchange—a player character can establish an agreement to buy or sell, with virtual cash, a particular amount of a game resource or item at a specified virtual or real time period. A real cash value is determined that is equal to the virtual cash value of the buy or sell offer. If the player character is unable to sell or purchase the item at the specified time, either (i) a penalty, (ii) all or a portion of the real cash value of the contract or (ii) any combination of one and two above can be charged to the player's credit card.
7. Virtual help with solving a mission or other game parameter—a first player character can agree to help a second player character to solve a mission or other game parameter within a given time period. If the first player character fails to help the second player character complete the specified game parameter in the time specified, a penalty fee can be charged to his credit card. Alternatively, a first player character can agree to pay a second player character a specified virtual cash amount if the second player character agrees to help him to complete a mission or other game parameter. If the second player character helps the first player character to complete the game parameter, and the first player character does not pay the agreed to virtual obligation, the first player's credit card can be charged a penalty and or the real cash value of the virtual obligation.
8. Virtual Insurance Payments and Claims—a player character can insure an in-game item with another player character or a game server. A periodic virtual cash insurance premium payment can be determined for the item. If the player character cannot make a periodic virtual cash insurance premium payment, then his credit card is charged the real cash value of the periodic payment and/or a real cash fee. Alternatively, a first player character makes a claim on a virtual insurance policy. The game server verifies that the virtual insurance claim is legitimate, determines a virtual claim value, and charges a second player character (who issued the claim) the virtual claim value amount. If the second player character cannot pay the virtual claim value, then a cash value is determined and charged to the second player's credit card on file.
9. Virtual Shipping—a first player character can agree to ship an item for a second player character to a certain virtual location in the game before a certain virtual or real date. The shipment of the item is secured with a credit card associated with the first player character. If the item is not shipped or arrives late or damaged, a virtual cash fee can be charged to the player character account. If the first player character account does not have enough virtual cash to cover the fee, a real cash value for the fee can be determined and charged to the credit card associated with the first player character.

10. Virtual Deposits and Interest Payments—a first player character deposits virtual money into an account with a virtual bank owned by one or more other player characters. The deposit balance and any periodic virtual interest due on the balance are secured by at least one credit card associated with the player characters that own the virtual bank. If the bank is unable to pay a requested withdrawal amount equal or less than the virtual bank account balance, the credit card securing the deposit can be charged the real cash value of the requested withdrawal amount. Also, if the bank cannot make a periodic interest payment, the credit card securing the interest payment can be charged the real cash value of the payment.

11. Identification Verification—a player character may use a credit card as a means to identify himself as the owner of a player character and/or to establish liability for a player character's actions, including whether or not a player character pays bills on time, in full, etc.

12. Loyalty Program Identification—a player character may use a credit card number as a unique identifier for use as an ID for loyalty programs or frequent shopper programs and the like.

13. Layaway financing—a player character may purchase an in game object, service or resource, placing it into a "layaway" account and have monthly or other periodic charges added to his credit card until such time as the entire balance is paid off, at which time, the Player Character would receive the object, service or resource.

14. Virtual Taxes—A player character can agree to pay a certain amount of taxes, tariffs, tolls to a government structure run by the game server or by player characters. In the event that a player character cannot make a tax payment a real cash value for the virtual cash amount can be determined and charged to a credit card associated with the player character.

15. Virtual Adjudication—In the event of a dispute between player characters, a game server or player character operated trial can determine a virtual settlement that a first player character needs to pay to a second player character. The first player character is given a time period within which to pay the settlement. If the first player character cannot pay the virtual settlement by the time specified, a real cash value is generated for the virtual settlement and charged to his credit card.

16. Hacking the System or Breaking Rules—Player Characters can agree to pay penalties if they hack the system or break the rules. If it is determined that a player character has broken the rules or hacked the system, the credit card associated with the player character account can be charged a specified penalty amount.

According to one or more embodiments of the present invention, any financial account can be used by the player to secure the virtual contracts he establishes with his player characters. The following accounts are non-limiting examples of the type of player character-owned accounts that can be used, individually or in any combination, to secure a virtual contract:

1. credit card
2. debit card linked to a bank account
3. a bank account
4. a checking account
5. an IRA account
6. paypal account
7. Play time card—a player can buy a play time card that allows them to play for a specific period of time. A portion of the credit on the card can be locked up to secure virtual obligations in the game environment
8. personal guaranty—a player can sign a personal guaranty that allows the game server to put a lien on the player's real world assets in the event of a default on a contract in a game environment.
9. Escrow account—a player character can place virtual or real items in escrow that he can use as collateral against in game contracts.
10. Margin account—a game server or first player character can establish a margin account for a second player character that the second player character can use to secure in game contracts. A margin account could be automatically given to a player character by a game server once certain game attributes, skills, and levels have been reached.
11. Annuity account—a player character can allocate a portion or all of his payments due to him under an annuity, such as a life insurance payout, lottery winnings, judgment award, reverse mortgage, or any other annuity based income.

The amount charged to the player's credit card in the event of a default on a virtual contract can be:

1. The real cash value of the virtual obligation that was not paid
2. A specified penalty amount
3. A penalty amount generated based on the default amount
4. A real cash amount either equal to, less than or greater than the virtual amount.
5. Any combination of the above.

According to one or more embodiments of the present invention, the game server can automatically charge virtual cash values to the player character bank account or the game server can notify a player character when a virtual cash value is due.

According to one or more embodiments of the present invention, Player Characters who have reached certain levels of the game or acquired certain amount of virtual value in a game may not be required to secure their contracts with a credit card. Such "financially secure" Player Characters may vouch for less financially secure player characters by offering their virtual value as collateral. Alternatively or additionally, Player Characters may also receive margin dollars based on the level or skills they have obtained.

According to one or more embodiments of the present invention, Player characters can be given a warning and a grace period if they do not pay the virtual cash obligation on the virtual or real date specified or there is not sufficient virtual cash in their virtual cash account for the virtual obligation to be automatically withdrawn.

According to one or more embodiments of the present invention, warnings may be delivered by any one or more of the following mechanisms including, but not limited to, in game alerts, in game instant messaging, real world e-mail, voice mail, postal mail, or text messages.

According to one or more embodiments of the present invention, Player characters could have the choice of using virtual or real cash to pay the virtual obligation when it becomes due. Characters could be offered this option on every purchase they make in a game environment. For example, a player purchasing a game item in an in game exchange can elect to pay real or virtual money during the transaction. The exchange interface offers the choice between purchasing the item for real or virtual cash and the value of the item in real and virtual cash is displayed. If the player selects virtual cash, the amount is debited from his virtual cash account. If the player selects real cash, the amount is charged to his credit card on file.

According to one or more embodiments of the present invention, when making a decision to use real or virtual cash to pay for an item or service, the player character (and/or game server) may request bids from other player characters or entities to pay for the item at some level of exchange rate that differs from the current exchange rate. For example, if a player character wishes to buy a virtual sword and the price is: $10 USD or 100 units of in game currency (e.g. piece of gold, $LD, etc.), there may be third party player characters that may desire to pay the real cash value in exchange for some amount of LD, that may be less or more than the current exchange rate.

According to one or more embodiments of the present invention, when a player's financial account cannot cover the real cash obligation specified by a virtual contract, the account can be suspended and the virtual assets owned by the player character can be automatically liquidated and the proceeds divided amongst virtual contract holders (other player characters or the game server) in ratio of the contract values. Alternatively or additionally, some or all of the virtual assets owned by the player may be immediately sold for their market value. The assets may be sold one at a time (in any order specified by the rules of the game server i.e. most to least valuable, least to most valuable, most to least liquid, least to most liquid, etc) until the virtual obligations of the player character have been met. If all the assets of the player character are sold and the virtual cash does cannot cover the virtual obligations, the cash can be paid to the creditors using any suitable means including, but not limited to: (i) in ratio equal to the obligation for each creditor compared to the total outstanding obligations; and/or (ii) in order of priority. A creditor can be given priority based on (i) paying to be a priority creditor when the virtual contract is established; (ii) the amount of the obligation; (iii) the date the virtual contract was established; (iv) the remaining obligation of the contract vs. the total obligation; or (v) paying off debts to independent third party player characters or entities as opposed to those player characters/entities that are either own by or related to the indebted player character.

According to one or more embodiments of the present invention, the game server can periodically ping the credit card or other financial account identifier of the player to make sure that there is adequate cash or credit line associated with the account to cover all the virtual obligations that the player has established with his characters.

According to one or more embodiments of the present invention, when a virtual obligation is established, an amount that is equal to or a percentage of that obligation can be locked on the credit card so that it cannot be used for anything other than covering the virtual obligation.

According to one or more embodiments of the present invention, when a virtual obligation is established, an interest in an insurance policy can be purchased for a fee that is charged to the credit card. According to one example of this embodiment, in the event of a default, the insurance policy pays the debt; however the player character's rating would be lowered and/or future policies rejected outright. If an insurance company (real or virtual) pays the debt, the insurance company could seek restitution from the defaulting player character.

According to one or more embodiments of the present invention, the game server can conduct a preauthorization of the player credit card equal to the cash value of the virtual obligation when the virtual contract is established. If the preauthorization fails, the contract cannot be executed and the appropriate parties (player characters and or game server) are notified.

According to one or more embodiments of the present invention, a player character may not be able to sell assets in a game or on an exchange between game servers or games if he has contracts established in a game environment. Alternatively, an amount of the player character's assets equal to his virtual cash obligations cannot be sold on an in game, inter game server, or intra game exchange.

According to one or more embodiments of the present invention, when a player character creates a contract, the game server can upsell a credit card to that player character to use to secure the contract. If the player character accepts the offer, he fills out a credit card application. The application is submitted to the card issuing bank. If the bank accepts the application, a new card number is issued and used to secure the contract.

According to one or more embodiments of the present invention, when a player creates a game account, the game server can upsell a credit card that the player character can use to secure contracts (and pay for his monthly fees) As an incentive to sign up for the card, the card can be issued with a certain amount of credit line that can be used to secure contracts with no payment obligation for the player. For example, the player could be given $50 worth of credit line to use to secure against in game contracts. If the player defaults on a contract in the game, the game can automatically charge the credit card account the specified penalty amount. As long as that amount is less than $50, then the player is not obligated to pay off the balance on the credit card.

According to one or more embodiments of the present invention, a fee can be charged by a game server or player character who facilitates and enforces the contracts between other player characters and the game server. This fee can be a flat fee, a "per transaction" fee, or a percent of the total value of the contract or payment fee.

According to one or more embodiments of the present invention, rather than a real cash fee being charged to a credit card only when the virtual obligation cannot be paid with virtual cash, the player can just pay a recurring real cash fee to borrow virtual cash in a game environment. Either the game server or the player character can issue the virtual loan and receive the monthly real cash fee. The monthly fee can be charged to the player character by the game server and a portion of the fee can be remitted, in real or virtual cash to a second player character who initiated the loan.

According to one or more embodiments of the present invention, a player character can rent a sum of virtual cash for a monthly real cash fee that is charged to his credit card. In this embodiment, a player pays a monthly real cash amount as long as he has borrowed a certain amount of money from a game server or other player character. According to one example of this embodiment, when the player character repays the loan, the real cash monthly fee may no longer collected by the game server.

According to one or more embodiments of the present invention, a player character can also rent a sum of virtual cash for a recurring virtual cash fee. If the player character cannot pay the recurring virtual cash fee, a real cash value is determined and charged to the player credit card.

According to one or more embodiments of the present invention, a player character can be offered the choice to pay a basic monthly fee for his account, or an additional monthly fee for his account that includes an upfront loan of virtual cash.

The present disclosure also provides systems for securing contracts established in virtual environments. Accordingly turning to FIG. 1, a suitable system 10 may include a central server 12 in electronic communication with any number of suitable programs including, for example and without limitation: a Contract Generation Program 14; a Contract Enforcement Program 16; a Asset Liquidation and Redistribution Program 18; a Credit Card Upsell Program 20; and a Virtual Cash to Real Cash Exchange Program 22.

System 10 may further comprise any number of suitable databases. Examples of suitable databases include, but are not limited to, a player database 24, a player character database 26, a contract database 28, and a virtual bank database 30.

Player database 24 may include information about each player who accesses the game. This information may be provided to the game server by a player when the player registers to play the game, or at any other suitable time and using any suitable means. Examples of player information include, but are not limited to: player ID, player contact information, player credit card information, and/or player character ID.

Player character database 26 may include information about each player character that participates, or is able to participate, in a game. Accordingly, it will be understood that according to some types of games, a single player may create and control more than one player character. Examples of information the player character database may maintain include, but are not limited to: player character ID, player character profile, player character asset(s), player character attribute(s), player character contract(s). Of course it will be understood that for many of these information categories, a given player character may have multiple entries. For example, a given player character may have any number of attributes which could be tracked and maintained by the player character database.

Contract database 28 may include information about any virtual agreements entered into by player characters. Examples of information the contract database may maintain include, but are not limited to: contract ID, player character ID, Player character type, contract type, contract obligation(s). Of course it will be understood that for many of these information categories, a given contract may have multiple entries. For example, a given contract entered into by a given player character may have numerous contract obligations which can be tracked and maintained by the contract database. Examples of contract obligation information that could be tracked and maintained by the contract database includes, but is not limited to: player character, obligation type, obligation amount, obligation date, obligation penalty, obligation grace period, obligation warning message, and default rules.

Virtual bank database 30 may include information related to the methods and financial instruments used to guarantee certain in-game agreements. For example, the virtual bank database may include information including, but not limited to: player character owner, player character owner credit card number, account balance, maximum deposit limit, interest rate, interest payment schedule, player character account, and loan account number. It will be appreciated that any of these categories of information may include subcategorizable information. For example, the player character account information may include numerous sub-categories of information including character ID, character balance, character interest rate, and interest payment schedule. Alternatively or additionally, the loan account information may include sub-categories of information including character ID, loan amount, payment(s), interest rate, and credit card number.

The following paragraphs describe various methods and steps therein according to the present disclosure:

Establishing a Contract a. Loan
  i. Player Character to Game Server
    1. Receive virtual contract initiation request including virtual cash loan amount from player character
    2. Determine contract obligations and conditions of loan
    3. Output obligation and conditions of loan
    4. Receive acceptance of obligations and conditions
    5. Retrieve or receive player credit card number associated with player character
    6. Activate and store virtual loan contract along with loan amount, obligations, conditions, limits (if any) and player credit card
    7. Issue virtual cash loan amount to player character
  ii. Player Character or Entity to Player Character or Entity
    1. Receive, store, and output and post virtual cash loan request from a first player character
    2. Receive, store, and output response to virtual cash loan request including obligations and conditions from a second player character
    3. Receive acceptance of obligations and conditions from first player character
    4. Retrieve or receive credit card associated with first player character
    5. Create, activate and store a virtual contract including obligations, conditions, and credit card
    6. Receive virtual cash loan amount from second player character
    7. Issue virtual cash loan amount to first player character b. Dividend
  i. Player Character (or Entity) to Player Character (or Entity)
    1. Receive a request to sell shares of a virtual company including a guaranteed virtual cash dividend per time period per share amount from a first player character
    2. Retrieve or receive a credit card associated with first player character
    3. Store request to sell shares including credit card and dividend information.
    4. Output request to sell shares
    5. Receive a request to buy shares from a second player character
    6. Receive virtual cash payment for shares from a second player character
    7. Distribute virtual cash payment for shares to first player character
    8. Receive shares for virtual cash payment
    9. Distribute shares to second player character c. Finance Option
  i. Player Character to Game Server
    1. Receive request to purchase an in game item with virtual cash from a player character
    2. Generate and output one or more virtual offers to finance the item purchase that includes a number of virtual cash payments at a specified number of time period intervals 3. Receive an acceptance of a finance offer from the player character
4. Retrieve or Receive a credit card associated with the player character
5. Establish and store financing contract including the virtual cash payment amount, the number of payments, the dates for each payment, and the credit card information.
6. Output virtual item to player character.

ii. Player Character to Player Character
1. Receive and post a request from a first player character to sell a virtual item, including a virtual purchase price and one or more finance option packages that include a finance payment price, a total number of finance payments, and a schedule of when the payments are due.
2. Receive virtual item from virtual account of first player character
3. Receive a request to purchase the virtual item from a second player character including an agreement to purchase the item with a finance option package.
4. Retrieve or Receive the credit card number associated with the second player character
5. Store request to purchase the virtual item with the credit card
6. Output virtual item to second player character account d. Item Creation
i. Player Character to Player Character
1. Receive, Store and Output a request to assemble an in-game item, including at least one of (i) a virtual cash amount, (ii) a blueprint, (iii) in game natural resources and game items necessary to assemble the item, (iv) a date/time of expected delivery, and (v) the agreed upon or expected quality of the item or its constituent components.
2. Receive an acceptance of the offer by a second player character who has the appropriate skills necessary to assemble the item, including the price and a time when the item will be complete.
3. Receive or retrieve a credit card associated with the second player character.
4. Store credit card with accepted offer to assemble an in-game item.

e. Futures Contracts
i. Player Character to Game Server
1. Receive a virtual offer to buy or sell an in game item or in game resource at a specified later date and price, including an offer amount from a player character
2. Accept offer
3. Retrieve or receive credit card associated with player character
4. Store credit card with offer
5. Receive offer amount from player character ii. Player Character to Player Character
1. Receive a virtual offer to buy or sell an in game item or in game resource at a specified later date and price, including an offer amount from a first player character
2. Receive an acceptance of the virtual offer from a second player character
3. Receive or retrieve a credit card associated with the first player
4. Create, activate, and store a virtual offer contract including the credit card number of the first player character
5. Receive virtual offer amount from second player character account
6. Transmit virtual offer amount to first player character account (less transaction fee if applicable)

f. Help with Solving a Mission
i. Player Character to Player Character
1. Receive, store and output a virtual request for help in solving a virtual mission from a first player character including a mission, a date by which the mission must be complete, an amount to pay if the mission is completed and a penalty for not completing the mission
2. Receive an acceptance of the virtual request from a second player character
3. Receive or retrieve a credit card for both player one and player two
4. Store credit cards with request
5. Make request active
6. Determine if request was fulfilled by specified date
7. If request was fulfilled charge virtual payment amount to first player character virtual account.
    a. If first player character virtual account cannot fulfill payment amount, determine real cash value for virtual payment amount and charge real cash value to credit card or insurance policy associated with first player character
8. If request was not fulfilled, retrieve virtual penalty amount and charge amount to virtual account of second player character
    a. If virtual account of second player cannot cover virtual penalty amount, determine real cash value of virtual penalty and charge real cash value to credit card or insurance policy associated with second player character g. Insurance Premium
i. Player Character to Player Character
1. Receive, store and output a virtual contract to insure a particular virtual item from a first player character
2. Receive an offer to accept the contract, including at least one virtual insurance premium amount from a second player character
3. Receive an acceptance of the virtual insurance premium amount from the first player character
4. Retrieve or receive a credit card for both the first and second player character
5. Activate virtual insurance contract and store credit card numbers with contract
6. When virtual premium is due, charge premium amount to virtual account of the first player character
    a. If the virtual premium payment cannot be taken from the virtual account of the first player character, determine a real cash value for the virtual premium and charge the real cash value to the player character's credit card ii. Player Character to Game Server
1. Receive a request to insure a virtual item from a player character
2. Generate and output at least one virtual insurance premium amount including at least one date when the premium amount is due.
3. Receive acceptance of virtual insurance premium amount
4. Create virtual insurance contract
5. Retrieve or receive a credit card associated with player character 6. Store credit card with virtual insurance premium amount.
h. Insurance Claim
   i. Player Character to Player Character
      1. Receive a virtual claim on an virtual insurance contract from a first player character
      2. Determine if virtual claim is valid
      3. If claim is valid, determine a virtual claim value based on virtual insurance contract
      4. Determine a second player character who issued the virtual insurance contract
      5. Output request for virtual payment for virtual claim value to a second player character
      6. If second player character does not pay the virtual payment, determine a real cash value for the virtual claim value
      7. Charge the real cash value to the credit card associated with the second player character.
i. Shipping
   i. Player Character to Player Character
      1. Receive a virtual item to ship from a first player character including a present virtual location and a requested virtual location
      2. Determine and output a virtual shipping amount, delivery date, and real cash penalty amount
      3. Receive acceptance of shipping amount and delivery date from a second player character
      4. Receive or retrieve a credit card associated with second player character
      5. Create shipping contract with virtual item, shipping amount delivery date, penalty amount, and credit card
      6. Determine if item was delivered on or before delivery date
      7. If item was delivered, charge shipping amount to first player character account
      8. If item was not delivered, retrieve penalty amount
      9. Charge penalty amount to credit card
   ii. Player Character to Game Server
      1. Receive a virtual item to ship from a player character including a present virtual location and a requested virtual location
      2. Determine and output a virtual shipping offer, including a virtual shipping amount, delivery date, and real cash penalty amount
      3. Receive acceptance of the virtual shipping offer
      4. Receive or retrieve credit card associated with player character
      5. Deliver item
      6. Charge shipping amount to player character
         a. If player character cannot pay shipping amount, retrieve real cash penalty amount and charge amount to player credit card.
j. Virtual Bank Deposit
   i. Player Character to Game Server (set up virtual bank)
      1. Receive a request to set up a virtual bank from a player character including one or more credit cards with corresponding credit lines
      2. Set up virtual bank with an allowed deposit limit equal to the corresponding credit lines
      3. Receive an interest rate amount
      4. Store interest rate amount with virtual bank
   ii. Player Character to Player Character (receive deposit)
      1. Output a bank deposit offer from a first player character, including a maximum deposit amount and an interest rate
      2. Receive a request to make a virtual cash deposit from a second player character that is equal or less than the maximum deposit amount
      3. Determine if second player character already has an account with the virtual bank
         a. If not, set up virtual bank account for second player character and deposit virtual cash funds
         Or
         b. If so, deposit virtual cash funds into existing virtual bank account associated with second player character
      4. Reduce maximum allowed deposit amount by virtual cash deposit
k. Taxes
   i. Player character to game server or player character
      1. Receive request from a player character to become a member of a virtual entity or use a virtual service
      2. Generate and output a tax amount
      3. Receive an acceptance of the tax amount from the player character
      4. Retrieve or receive a credit card associated with the player character
      5. Create a membership or permit including player character information and credit card number
l. Adjudication
   i. Player character to player character
      1. Receive and Store a determination of a virtual settlement amount to be paid by a first player character to a second player character including a virtual cash amount and a due date
      2. Receive or retrieve a credit card associated with the first player character
      3. Store credit card with determination
m. Breaking rules or hacking the game
   i. Player character to game server (initial agreement)
      1. Receive request to create an account from a player
      2. Output terms and conditions including agreement to charge penalty fees to a credit card in the event of rule breaking or hacking
      3. Receive and store acceptance of terms, player information, and player credit card information
Enforcing a Contract
a. Loan, Dividend, Finance Payment, Insurance Premium
   ii. Player Character to Game Server
      1. Determine that a virtual obligation payment is due
      2. Charge obligation payment to player character account
      3. If player character account cannot cover obligation payment, determine a real cash value of obligation (including fees and/or penalties and fines)
      4. Charge real cash value to player credit card
   iii. Player Character to Player Character
      1. Receive a complaint that a first player character could not pay a second player character a virtual obligation payment
      2. Determine if complaint is valid
      3. If complaint is valid determine or retrieve a real cash value of obligation payment
      4. Charge real cash value to credit card associated with first player character
      5. Pay second player character the virtual obligation payment (in real or virtual cash)
b. Item Creation
   iv. Player Character to Player Character
      1. Receive a complaint that a first player character did not complete the creation of an item for a second player character.

2. Verify that complaint is valid
3. If complaint is valid, retrieve a real cash penalty value associated with the item creation contract
4. Retrieve a credit card associated with a first player character
5. Charge real cash penalty value to credit card
6. Credit real or virtual account of second player character with penalty value (less applicable fees)

c. Futures Contracts
  v. Player Character to Game Server
    1. Receive indication that player character could not fulfill futures contract
    2. Retrieve or Generate a penalty amount
    3. Charge penalty amount to virtual account of player character
    4. If virtual account cannot cover penalty, retrieve player credit card
    5. Determine a real cash value of the penalty amount
    6. Charge amount to player credit card
  vi. Player Character to Player Character
    1. Receive complaint from a first player character that a second player character could not fulfill a futures contract
    2. Verify that complaint is accurate
    3. Retrieve or generate a virtual penalty amount
    4. Retrieve credit card of second player character
    5. Charge second player character the virtual penalty amount
    6. If second player character account cannot cover virtual penalty amount, generate a real cash value
    7. Charge real cash value to credit card
    8. Pay penalty amount (in real or virtual cash) to the first player character, less any applicable fees.

d. Help with Solving a Mission
  vii. Player Character to Player Character
    1. Receive a complaint that a first player character has not successfully helped a second player character complete a mission
    2. Verify complaint
    3. If complaint is accurate, retrieve virtual penalty
    4. Charge first player character account penalty amount
    5. If first player character account cannot cover penalty amount, determine real cash value of penalty amount
    6. Retrieve credit card associated with first player character
    7. Charge real cash value of penalty amount to credit card e. Insurance Claim
  viii. Player Character to Game Server
    1. Receive a complaint that a first player character has not paid an insurance claim to a second player character
    2. Validate complaint
    3. If complaint is validated, determine real cash value of claim
    4. Retrieve credit card associated with first player character
    5. Charge real cash value of claim to credit card (plus applicable fees)
    6. Pay real or virtual cash value of claim to second player character (less applicable fees)

f. Shipping Item
  ix. Player Character to Player Character
    1. Receive complaint that a first player character did not deliver an item for a second player character
    2. Validate complaint
    3. If complaint is validated, determine a real cash penalty amount
    4. Retrieve credit card of first player character
    5. Charge penalty amount to credit card (plus applicable fees)
    6. Determine a virtual cash value for the real cash penalty amount
    7. Pay virtual cash value to account of second player character (less applicable fees)
  x. Player Character to Game Server
    1. Deliver a virtual item to a specified virtual location
    2. Charge shipping amount to player character account
    3. If player character account cannot pay shipping amount, retrieve credit card associated with player character account
    4. Determine a real cash penalty amount
    5. Charge penalty amount to player credit card g. Virtual Bank Deposit
  xi. Player Character to Player Character
    1. Receive a request from a first player character to withdraw funds from a virtual bank account owned by a second player character
    2. Determine if the virtual bank has enough virtual cash to cover the withdrawal amount
      a. If yes, transfer funds from virtual bank account to first player character account
      b. If no, determine a real cash value for the withdrawal amount
        i. retrieve credit card associated with virtual bank
        ii. charge credit card real cash value of withdrawal amount (plus any fees)
        iii. transfer funds from virtual bank account to first player character account h. Virtual Bank Interest
  xii. Player Character to Player Character
    1. Determine that interest is due on a balance deposited by a player character in a virtual bank account.
    2. Calculate virtual cash interest payment
    3. Determine if virtual bank has enough virtual cash on hand to cover interest payment
      a. If so, make interest payment
      b. If not, determine a real cash value of interest payment
        i. Retrieve credit card associated with virtual bank
        ii. Charge credit card real cash value
        iii. Convert real cash value into virtual cash and deposit into virtual bank
        iv. Transfer virtual cash from virtual bank to player character bank account.

i. Taxes
  xiii. Player character to game server
    1. Receive or Generate indication that a virtual tax is due
    2. Determine virtual tax amount
    3. Attempt to charge tax amount to virtual cash account of player character
    4. If virtual cash account can cover tax amount, remove tax amount from account
    5. If virtual cash account cannot cover tax amount:
      a. Determine a real cash value of the virtual tax amount
      b. Retrieve credit card associated with player character account c. Charge real cash value to player character account (plus applicable fee)
d. Convert real cash value to virtual cash amount and deposit in virtual cash account of player
e. Remove virtual cash amount from player character virtual cash account xiv. Player character to player character
1. Receive or Generate indication that a virtual tax is due from a first player character to an entity controlled by one or more other player characters
2. Determine virtual tax amount
3. Attempt to charge tax amount to virtual cash account of player character
   a. If virtual cash account can cover tax amount, transfer virtual cash amount from first player character virtual cash account to virtual cash account of entity controlled by one or more other player characters
4. If virtual cash account cannot cover tax amount:
   a. Determine a real cash value of the virtual tax amount
   b. Retrieve credit card associated with first player character account
   c. Charge real cash value to first player character account (plus applicable fee)
   d. Convert real cash value to virtual cash amount and deposit in virtual cash account of first player
   e. transfer virtual cash amount from first player character virtual cash account to account of entity controlled by one or more other player characters j. Adjudication
xv. Player character to player character
1. Retrieve determination on due date
2. Attempt to charge virtual settlement amount to first player character virtual cash account
3. If first player character virtual cash account can cover settlement amount, transmit amount (less applicable fees) to second player character virtual cash account
4. If first player character virtual cash account cannot cover settlement amount:
   a. Determine a real cash value for the virtual settlement amount
   b. Charge real cash value to credit card associated with first player character
   c. Convert real cash to virtual cash
   d. Transfer virtual cash (less applicable fees) to the virtual cash account of the second player character k. Breaking rules or hacking the game
xvi. Player character to game server (infraction occurrence)
1. Determine that a player character has committed an infraction
2. Determine a penalty amount
3. Retrieve credit card associated with player character
4. Charge credit card penalty amount Locking player character accounts and liquidating assets
a. Determine that a virtual obligation cannot be paid with a virtual account associated with a player character
b. Determine a real cash value for the virtual obligation
c. Retrieve credit card associated with player character
d. Attempt to charge real cash value of virtual obligation to credit card
e. If attempt fails, lock virtual assets of player character account,
f. Post and sell virtual assets on appropriate in game marketplace or exchange
g. Retrieve virtual creditor list
h. Determine % of player character asset value due to each virtual creditor
i. Transmit appropriate % of asset value to each virtual creditor Generating warning message if virtual obligation cannot be met
a. Determine that a virtual obligation cannot be paid with a virtual account associated with a player character
b. Determine a real cash value for the virtual obligation
c. Retrieve credit card associated with player character
d. Attempt to charge real cash value of virtual obligation to credit card
e. If attempt fails, output warning message to player character Disabling selling virtual assets if Player Character has virtual obligations
a. Determine a total virtual obligation amount for a player character
b. Set a minimum virtual asset limit for the player account based on the total virtual obligation amount
c. Disallow selling of any player character assets below virtual asset minimum.

Periodic check of credit card validity
a. Determine that a player character account has a virtual obligation secured by a credit card
b. Retrieve credit card number
c. Verify that credit card is valid and/or has enough remaining credit to cover virtual obligation.
d. If credit card is not valid and/or does not have enough remaining credit to cover a virtual obligation, lock assets of player character account equal to total virtual obligation amount.

Credit card upselling during contract initiation
a. Receive request to initiate a virtual contract from a player character
b. Output offer to register for a credit card to secure the transaction
c. Receive acceptance of offer, including player billing information
d. Submit credit card application for approval
e. If credit card application is accepted, bind virtual contract with new credit card.
f. If credit card application is denied, output request to player character to use a different credit card to bind virtual contract
  xvii. Receive alternate credit card from player character
  xviii. Use alternate credit card to bind contract Credit card upselling during player set up
a. Receive request to create new player account
b. Output offer to register for a credit card, including an upfront virtual benefit if offer is accepted
c. Receive acceptance of offer, including player billing information
d. Submit credit card application for approval
e. If credit card application is accepted, issue credit card, set up player account with credit card, and store virtual benefit with player account
f. If credit card application is denied, output request for alternate credit card
  xix. Receive alternate credit card
  xx. Set up player account with alternate credit card Providing a choice between virtual cash or credit card charge
  a. Determine that a virtual obligation of a player character is due
  b. Determine a virtual and real cash value of the obligation
  c. Output notification that virtual offer is due, including choice to pay for virtual obligation with real or virtual cash
    xxi. Receive indication that virtual obligation will be paid with real cash
    xxii. Charge real cash value to credit card associated with player character account
    Or
    xxiii. Receive indication that virtual obligation will be paid with virtual cash
    xxiv. Charge virtual cash value to player character virtual account
Real cash charge to credit card for virtual loan payment or rental
  a. Determine that a virtual obligation of a player character is due
  b. Determine real cash value of virtual obligation
  c. Retrieve credit card associated with player character
  d. Charge real cash value of virtual obligation to credit card.

Of course it will be appreciated that the systems methods described herein are provided for the purposes of example only and that none of the above systems methods should be interpreted as necessarily requiring any of the disclosed components or steps nor should they be interpreted as necessarily excluding any additional components or steps.

The invention is described with reference to several embodiments. However, the invention is not limited to the embodiments disclosed, and those of ordinary skill in the art will recognize that the invention is readily applicable to many other diverse embodiments and applications. Accordingly, the subject matter of the present disclosure includes all novel and nonobvious combinations and subcombinations of the various systems, methods and configurations, and other features, functions, and/or properties disclosed herein.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each claim in a set of claims has a different scope. Therefore, for example, where a limitation is explicitly recited in a dependent claim, but not explicitly recited in any claim from which the dependent claim depends (directly or indirectly), that limitation is not to be read into any claim from which the dependent claim depends.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device or article is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments of the invention nor a listing of features of the invention which must be present in all embodiments.

Neither the Title (set forth at the beginning of the first page of this patent application) nor the Abstract (set forth at the end of this patent application) is to be taken as limiting in any way as the scope of the disclosed invention(s). An Abstract has been included in this application merely because an Abstract of not more than 150 words is required under 37 C.F.R. § 1.72(b).

The title of this patent application and headings of sections provided in this patent application are for convenience only, and are not to be taken as limiting the disclosure in any way.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described in a sequential order, such processes may be configured to work in different orders. In other words, any sequence or order of steps that may be explicitly described does not necessarily indicate a requirement that the steps be performed in that order. On the contrary, the steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

Unless expressly specified otherwise, an enumerated list of items (which may or may not be numbered) does not imply that any or all of the items are mutually exclusive. Therefore it is possible, but not necessarily true, that something can be considered to be, or fit the definition of, two or more of the items in an enumerated list. Also, an item in the enumerated list can be a subset (a specific type of) of another item in the enumerated list. For example, the enumerated list "a computer, a laptop, a PDA" does not imply that any or all of the three items of that list are mutually exclusive—e.g., an item can be both a laptop and a computer, and a "laptop" can be a subset of (a specific type of) a "computer".

Likewise, unless expressly specified otherwise, an enumerated list of items (which may or may not be numbered) does not imply that any or all of the items are collectively exhaustive or otherwise comprehensive of any category. For example, the enumerated list "a computer, a laptop, a PDA" does not imply that any or all of the three items of that list are comprehensive of any category.

Further, an enumerated listing of items does not imply that the items are ordered in any manner according to the order in which they are enumerated.

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in this patent application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

The present disclosure provides, to one of ordinary skill in the art, an enabling description of several embodiments and/or inventions. Some of these embodiments and/or inventions may not be claimed in this patent application, but may nevertheless be claimed in one or more continuing applications that claim the benefit of priority of this patent application. Applicants intend to file additional applications to pursue patents for subject matter that has been disclosed and enabled but not claimed in this patent application.

What is claimed is:

1. A method performed by a computer, the method comprising:
    providing, by a Video Game Central Server, a virtual environment that is accessible to one or more players;
    receiving, by the Video Game Central Server, credit card information from a player;
    receiving, by the Video Game Central Server, a request to enter into a virtual contract from the player; wherein the virtual contract includes a condition that requires the player to engage in an action other than accessing the virtual environment;
    guaranteeing, by the Video Game Central Server, the player's performance of the condition identified in the virtual contract with the financial instrument;
    penalizing, by the Video Game Central Server, the player if the condition is not met, by imposing a financial obligation on the credit card,
    where the condition is paying a periodic insurance premium for a virtual item; and maintaining, by the Video Game Central Server, the player's credit history by maintaining records of the player's contract obligations and rate of success in fulfilling the obligations.

2. The method of claim 1, where the credit card number is further used as a means to identify the player.

3. A method performed by a computer, the method comprising:

provinding, by a Video Game Central Server, a virtual environment that is accessible to one or more players;

receiving, by the Video Game Central Server, credit card information from a player;

receiving, by the Video Game Central Server, a request to enter into a virtual contract from the player; wherein the virtual contract includes a condition that requires the player to engage in an action other than accessing the virtual environment;

guaranteeing, by the Video Game Central Server, the player's performance of the condition identified in the virtual contract with the financial instrument;

penalizing, by the Video Game Central Server, the player if the condition is not met, by imposing a financial obligation on the credit card, where the condition is resolving a settlement action imposed by a virtual adjudication system; and maintaining the player's credit history by maintaining records of the player's contract obligations and rate of success in fulfilling the obligations.

4. The method of claim 3 where the credit card number is further used as a means to identify the player.

* * * * *